US012631310B1

(12) United States Patent
Chen

(10) Patent No.: US 12,631,310 B1
(45) Date of Patent: May 19, 2026

(54) HIGH EFFICIENCY STOP LAMP

(71) Applicant: Ford Global Technologies, LLC, Dearborn, MI (US)

(72) Inventor: Linsheng Chen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 19/010,522

(22) Filed: Jan. 6, 2025

(51) Int. Cl.

| | |
|---|---|
| ***F21S 43/247*** | (2018.01) |
| ***F21S 43/20*** | (2018.01) |
| ***F21S 43/237*** | (2018.01) |
| ***F21S 43/31*** | (2018.01) |
| ***F21W 103/35*** | (2018.01) |
| ***F21Y 115/10*** | (2016.01) |

(52) U.S. Cl.
CPC ........... *F21S 43/247* (2018.01); *F21S 43/237* (2018.01); *F21S 43/26231* (2024.05); *F21S 43/2641* (2024.05); *F21S 43/315* (2018.01); *F21W 2103/35* (2018.01); *F21Y 2115/10* (2016.08)

(58) Field of Classification Search
CPC .......................... F21S 43/26231; F21S 43/315
See application file for complete search history.

(56) References Cited

U.S. PATENT DOCUMENTS

| | | | | |
|---|---|---|---|---|
| 7,342,707 | B2 | 3/2008 | Roberts et al. | |
| 7,401,948 | B2 * | 7/2008 | Chinniah | G02B 19/0061 362/310 |
| 10,761,254 | B2 * | 9/2020 | Sousek | F21S 43/315 |
| 11,572,996 | B1 | 2/2023 | Chen et al. | |
| 2006/0164839 | A1 * | 7/2006 | Stefanov | F21S 43/247 362/327 |
| 2012/0218772 | A1 * | 8/2012 | Mitsuhashi | F21S 43/315 362/516 |
| 2019/0301705 | A1 * | 10/2019 | Schickel | F21S 41/143 |
| 2021/0180761 | A1 | 6/2021 | Czirmer et al. | |
| 2023/0043865 | A1 * | 2/2023 | Wu | F21V 7/06 |

FOREIGN PATENT DOCUMENTS

| | | |
|---|---|---|
| CN | 107949742 A | 4/2018 |
| CN | 108139062 A | 6/2018 |

* cited by examiner

*Primary Examiner* — Eric T Eide
(74) *Attorney, Agent, or Firm* — Vichit Chea; Carlson, Gaskey & Olds, P.C.

(57) ABSTRACT

An assembly includes a collimator having one end associated with a light source, a pillow lens associated with the collimator, and at least one surface that is non-coplanar with the pillow lens. The assembly further includes at least one light pipe, wherein a first portion of light is directed through the pillow lens and a second portion of light exits the pillow lens and is directed by the at least one surface into the at least one light pipe.

25 Claims, 6 Drawing Sheets

HIGH EFFICIENCY STOP LAMP

TECHNICAL FIELD

This disclosure relates generally to a light guide arrangement, and relates more specifically to a collimator conveying some light to a pillow lens and some light to light pipes within a stop lamp.

BACKGROUND

Vehicles include stop lamps that are mounted on rear facing structures of the vehicle. Traditionally, there are stop lamps at the rear of the vehicle on a driver side and a passenger side.

SUMMARY

An assembly according to an exemplary aspect of the present disclosure includes, among other things: a collimator having one end associated with a light source; a pillow lens associated with the collimator; at least one surface that is non-coplanar with the pillow lens; and at least one light pipe, wherein a first portion of light is directed through the pillow lens and a second portion of light exits the pillow lens and is directed by the at least one surface into the at least one light pipe.

In a further non-limiting embodiment of any assembly, the collimator comprises a conical body portion having a first outer peripheral dimension extending about a center axis at one end and a second outer peripheral dimension extending about the center axis at an opposite end that is greater than the first outer peripheral dimension, and wherein the conical body portion has an outer peripheral surface that continuously increases in taper from the one end to the opposite end.

In a further non-limiting embodiment of any assembly, the light source is centered on the center axis at the one end.

In a further non-limiting embodiment of any assembly, the at least one surface extends at an oblique angle relative to the center axis.

In a further non-limiting embodiment of any assembly, the at least one surface comprises at least a first angled surface and a second angled surface, wherein each of the first angled surface and the second angled surface extend at an oblique angle relative to the center axis.

In a further non-limiting embodiment of any assembly, the first angled surface faces the second angled surface.

In a further non-limiting embodiment of any assembly, the first angled surface covers a first side portion of the pillow lens and the second angled surface covers a second side portion of the pillow lens leaving a center portion of the pillow lens uncovered.

In a further non-limiting embodiment of any assembly, the at least one light pipe comprises at least a first light pipe and a second light pipe, and wherein the first angled surface extends from a first edge at the pillow lens outwardly away from the pillow lens to a second edge that is associated with the first light pipe, and wherein the second angled surface extends from a first edge at the pillow lens outwardly away from the pillow lens to a second edge that is associated with the second light pipe.

In a further non-limiting embodiment of any assembly, the oblique angle comprises approximately a 45 degree angle or greater.

In a further non-limiting embodiment of any assembly, the light source comprises a LED that is associated with a stop lamp or tail lamp.

In a further non-limiting embodiment of any assembly, a plurality of prisms are inside of the at least one light pipe.

An assembly according to an exemplary aspect of the present disclosure includes, among other things: a plurality of light pipes including at least a first light pipe and a second light pipe; a collimator positioned within a gap between opposing ends of the first light pipe and the second light pipe; a light source positioned at one end of the collimator; a pillow lens covering an opposite end of the collimator; a first surface that is non-coplanar with the pillow lens and extends toward the first light pipe; and a second surface that is non-coplanar with the pillow lens and extends toward the second light pipe, wherein a first portion of light is directed through the pillow lens and a second portion of light exits the pillow lens and is directed by the first surface into the first light pipe and by the second surface into the second light pipe.

In a further non-limiting embodiment of any assembly, the plurality of light pipes comprise a plurality of additional light pipes that are connected to the first light pipe and the second light pipe in series, and wherein each set of opposing ends of adjacent light pipes are separated from each other by a gap that receives one collimator.

In a further non-limiting embodiment of any assembly, the collimator comprises a conical body portion having a first outer peripheral dimension extending about a center axis at one end and a second outer peripheral dimension extending about the center axis at an opposite end that is greater than the first outer peripheral dimension, and wherein the conical body portion has an outer peripheral surface that continuously increases in taper from the one end to the opposite end.

In a further non-limiting embodiment of any assembly, the light source is centered on the center axis at the one end.

In a further non-limiting embodiment of any assembly, each of the first surface and the second surface extend at an oblique angle relative to the center axis.

In a further non-limiting embodiment of any assembly, the first surface covers a first side portion of the pillow lens and the second surface covers a second side portion of the pillow lens leaving a center portion of the pillow lens uncovered.

In a further non-limiting embodiment of any assembly, at least some of the first portion of light exits the pillow lens via the center portion in a direction that extends along the center axis, and wherein the second portion of light is directed into the first light pipe and the second light pipe to extend along paths that are generally perpendicular to the center axis.

In a further non-limiting embodiment of any assembly, a plurality of prisms are inside at least one of the first light pipe and the second light pipe.

A method according to an exemplary aspect of the present disclosure includes, among other things: positioning a collimator in a gap between two opposing ends of adjacent light pipes; positioning a light source at one end of the collimator; covering an opposite end of the collimator with a pillow lens; directing a first portion of light through the pillow lens; and directing a second portion of light exiting the pillow lens into the adjacent light pipes via angled surfaces extending way from the pillow lens.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
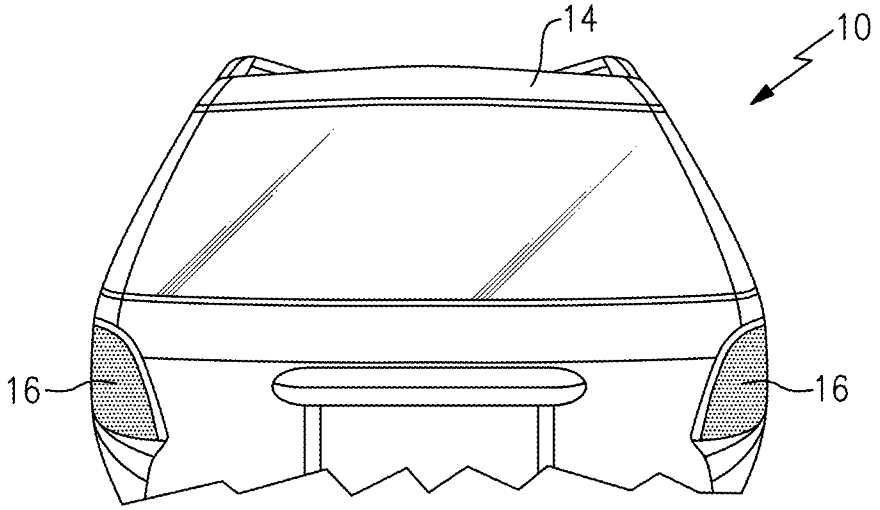
FIG. 1 illustrates a rear view of a vehicle with a plurality of stop lamps.

As shown in FIG. 1, this disclosure is directed to a vehicle 10 with stop lamps 16 at the rear facing structure 14 of the vehicle on a driver side and a passenger side. It should be understood that this is one example of a stop lamp configuration, and other stop lamp configurations could also be used for different types of vehicles.

The subject disclosure provides for a collimator 20 (FIG. 2) that is used in stop lamp applications to collect substantially all light from an associated light source, and which then redistributes the collected light to fully illuminate the stop lamps 16 to specified requirements. The collimator 20 could also be used for tail lamps, for example.

A light collimator is a device that is used to narrow a beam of light so that the rays travel generally parallel to each other, rather than diverging or converging. In some implementations, light enters through an input aperture or opening at one end of the collimator 20 and lenses or mirrors are used to redirect light rays to provide an output collimator beam.

In one example, the collimator 20 comprises a collimator light-emitting diode (LED) lens.

Figure 3:
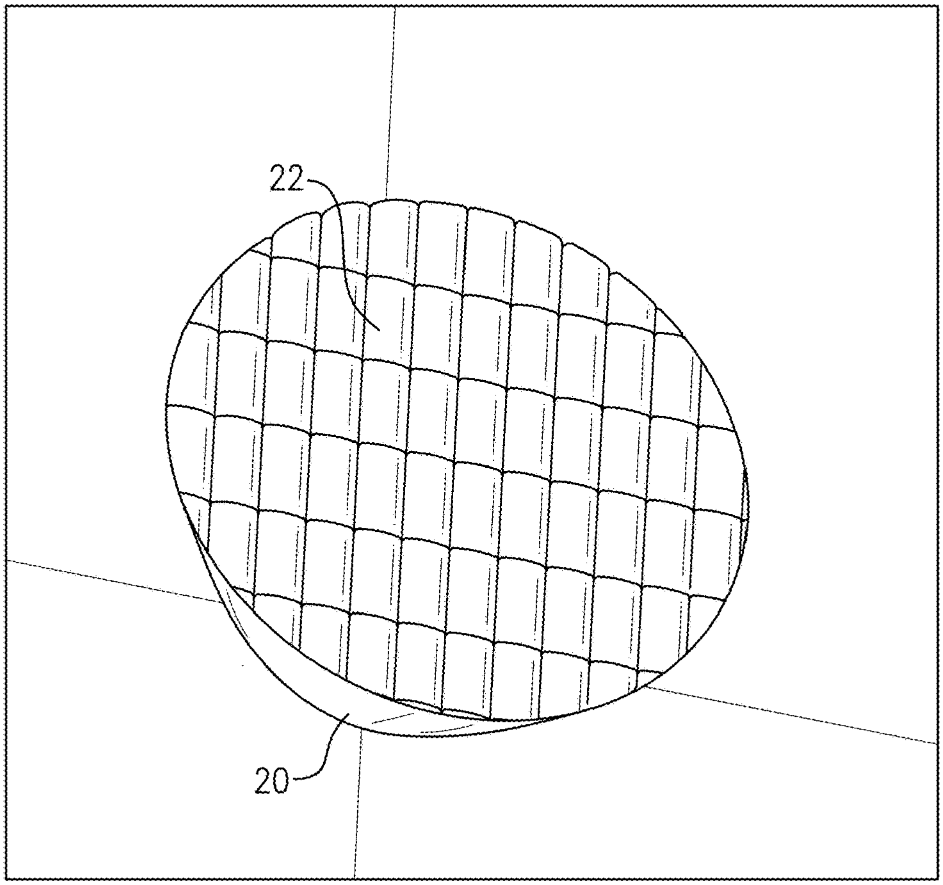
FIG. 3 is a top view of the collimator lens of FIG. 2 covered with a pillow lens.

In one example, a pillow lens 22 is associated with the collimator 20 as shown in FIG. 3. In some implementations, other lens shape could also be used to spread light to meet required specifications. While a pillow lens is an easy and efficient lens form to spread light left/right and top/down to meet requirements, other lens can also be used to provide different styling options, such as variable rotational lens, for example.

Figure 5:
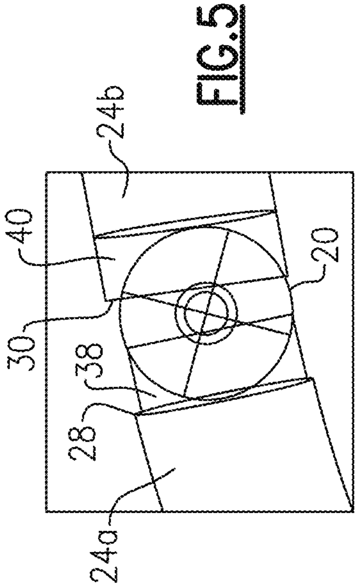
FIG. 5 is a top view a collimator lens connection interface between two light pipes.
Figure 6:
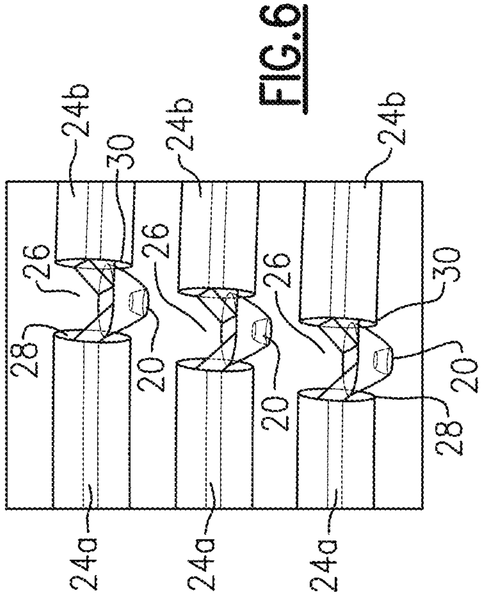
FIG. 6 is a side perspective view of the collimator lens connection interface between light pipes.

In some implementations, an assembly is provided that comprises a plurality of light pipes 24 (FIG. 4) including at least a first light pipe **24*a* and a second light pipe 24*b* (FIGS. 5-6**).

In some implementations, for a light pipe, prisms are typically used to extract light from the light pipe for exterior lighting; however, light diffuse fibers that are typically used for interior lighting may also be used.

In one example, the collimator 20 is positioned within a gap 26 between opposing ends 28, 30 of the respective first light pipe **24*a* and the second light pipe 24*b***.

Figure 7A:
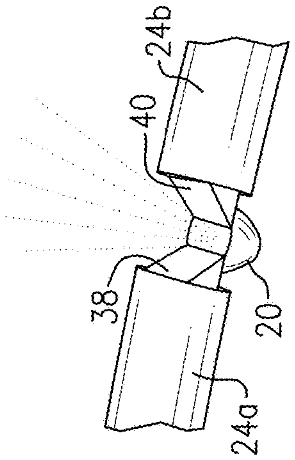
FIG. 7A is a perspective view of a collimator lens connection interface between two light pipes.
Figure 7B:
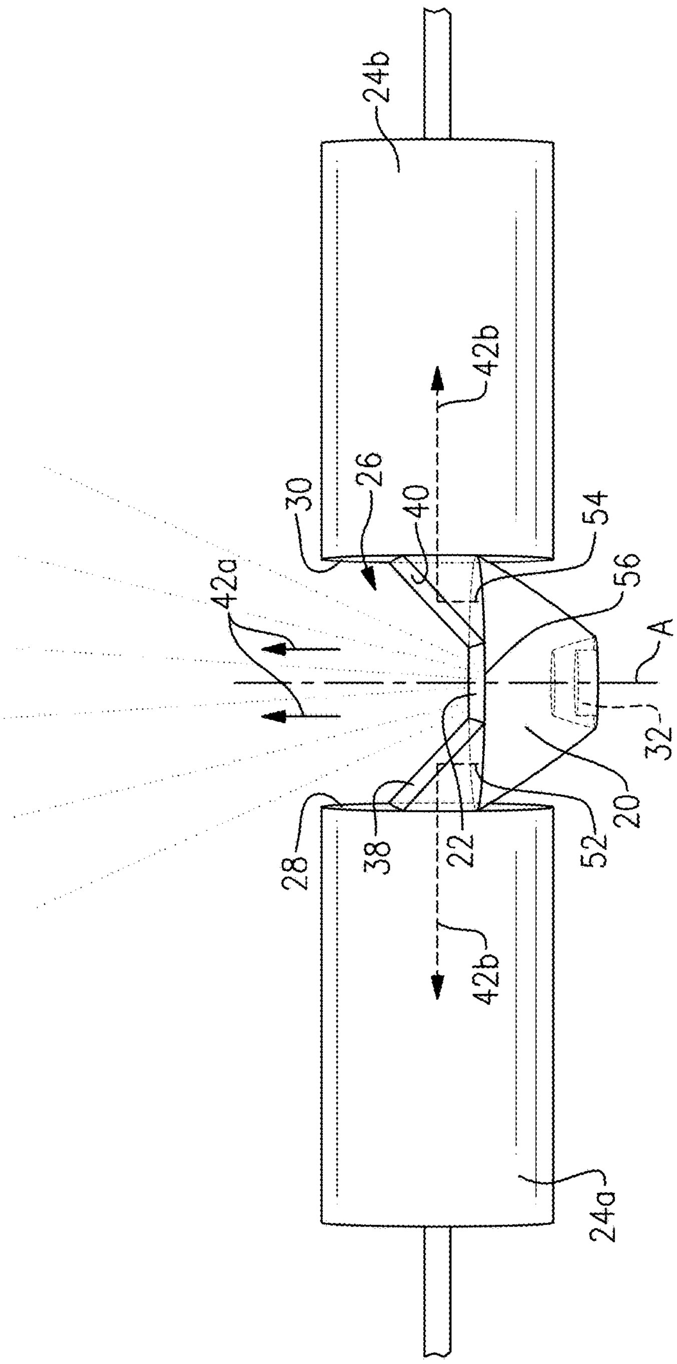
FIG. 7B is an enlarged side view of the collimator lens connection interface of FIG. 7A.

As shown in FIGS. 7A-B, a light source 32 is positioned at one end 34 of the collimator 20 and the pillow lens 22 is positioned at an opposite end 36 of the collimator 20.

In one example, the pillow lens 22 substantially covers the opposite end 36 of the collimator 20.

In some implementations, the assembly further includes a first surface 38 that is non-coplanar with the pillow lens 22 and extends toward the first light pipe 24, and a second surface 40 that is non-coplanar with the pillow lens 22 and extends toward the second light pipe **24*b* as shown in FIGS. 7A-B**.

In the disclosed assembly, a first portion of light **42*a* is directed through the pillow lens 22 and a second portion of light 42*b* exits the pillow lens 22 and is directed by the first surface 38 into the first light pipe 24*a* and is directed by the second surface 40 into the second light pipe 24*b***.

In some implementations, the collimator 20 comprises a conical-shaped body 44 with a passageway extending therethrough. In one example, the conical-shaped body 44 comprises a three-dimensional object with a geometric shape that has a circular or elliptical base and tapers smoothly to a reduced diameter portion. The tapering sides form a curved surface, giving the collimator a cone-like appearance.

Figure 2:
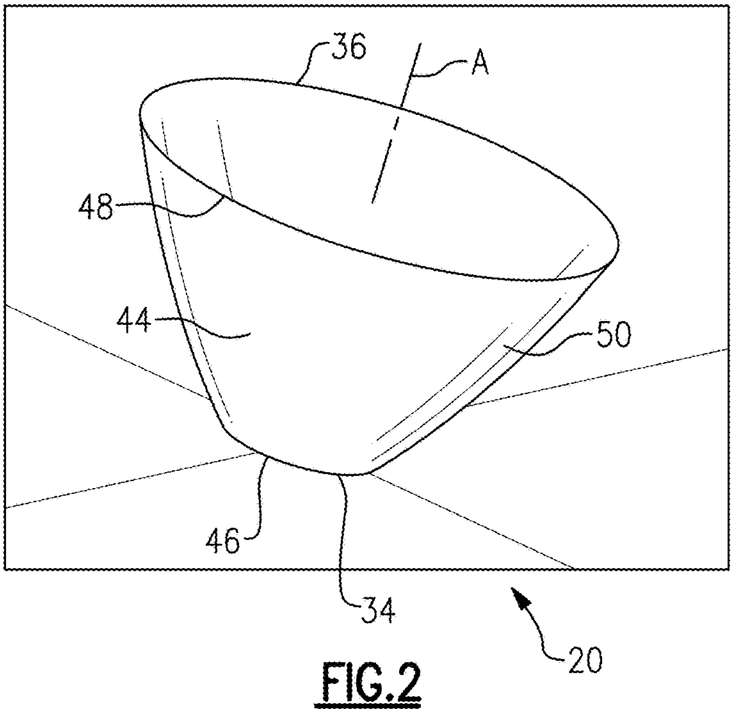
FIG. 2 is a perspective view of a collimator lens.

In one example, as best shown in FIG. 2, the conical body 44 has a first outer peripheral dimension 46 extending about a center axis A at the one end 34 and a second outer peripheral dimension 48 extending about the center axis A at the opposite end 36. The second outer peripheral dimension 48 is greater than the first outer peripheral dimension 46, and the conical body 44 has an outer peripheral surface 50 that continuously increases in taper from the one end 34 to the opposite end 36. In one example, the first outer peripheral dimension 46 comprises an outer diameter of the one end 34 and the second outer peripheral dimension 48 comprises an outer diameter of the opposite end 36.

In some implementations, the light source 32 is centered on the center axis A at the one end 34 of the collimator 20.

In one example, the light source 32 comprises a LED that is associated with the stop lamps 16.

Figure 9:
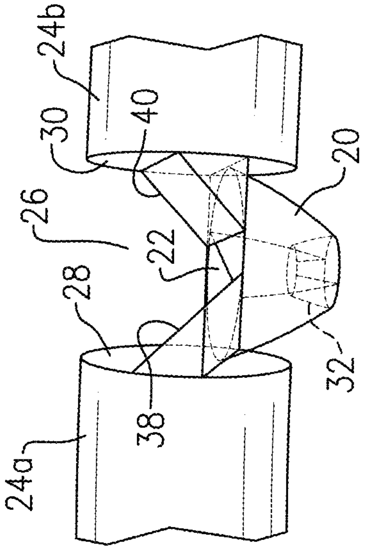
FIG. 9 is a side view of another example of a collimator lens connection interface between two light pipes.

In some implementations, the first surface 38 is comprises a first angled surface and the second surface 40 comprises a second angled surface In one example, each of the first angled surface 38 and the second angled surface 40 extend at an oblique angle relative to the center axis A. In one example, the first angled surface 38 and the second angled surface 40 extend at the same angles (FIG. 7B). In another example, the first angled surface 38 and the second angled surface 40 may extend at different angles (FIG. 9).

In one example, the oblique angle comprises approximately a 45 degree angle or greater. In some implementations, the angle can be varied by +/−5 degrees from the 45 degree angle.

Figure 11:
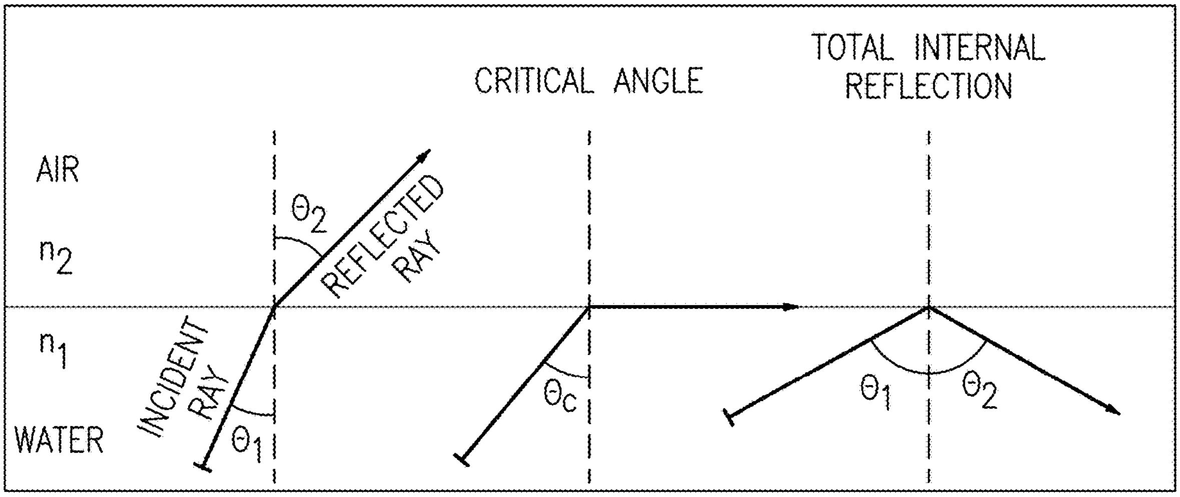
FIG. 11 is a representation of critical angle and total internal reflection as related to first and second angled surfaces of the collimator lens and light pipe arrangement.

FIG. 11 shows an example that the angle can be greater than 45 degrees due to Total Internal Reflection (TIR). The formula is: $n1 \times \sin \theta 1 = n2 \times \sin \theta 2$. n1 is index of refraction of optical material, and n1=1.586 for PC, n1=1.49 for PMMA. n2=1 for air. For TIR to happen, $1.49 \times \sin \theta 1 = 1 \times \sin 90°, \theta 1 = 42.15°$ (For PMMA)

$1.586 \times \sin \theta 1 = 1 \times \sin 90°, \theta 1 = 39.1°$ (For PC)

In one example, the first angled surface 38 faces the second angled surface 40 as best shown in FIG. 7B.

In one example, the first angled surface 38 covers a first side portion 52 of the pillow lens 22 and the second angled surface 40 covers a second side portion 54 of the pillow lens leaving a center portion 56 of the pillow lens 22 uncovered.

In one example, the first angled surface 38 extends from a first edge at the pillow lens 22 outwardly away from the pillow lens 22 to a second edge that is associated with the first light pipe 24*a*, and the second angled surface 40 extends from a first edge at the pillow lens 22 outwardly away from the pillow lens 22 to a second edge that is associated with the second light pipe 24*b*.

This configuration provides for the first portion of light 42*a* being directed through the pillow lens 22 in a direction generally along the axis A, and for the second portion of light 42*b* exiting the pillow lens 22 and being directed by the first surface 38 into the first light pipe 24*a* and by the second surface 40 into the second light pipe 24*b* in directions that are transverse to the axis A.

In one example, the second portion of light 42*b* is directed in a direction that is perpendicular to the axis A.

Figure 4:
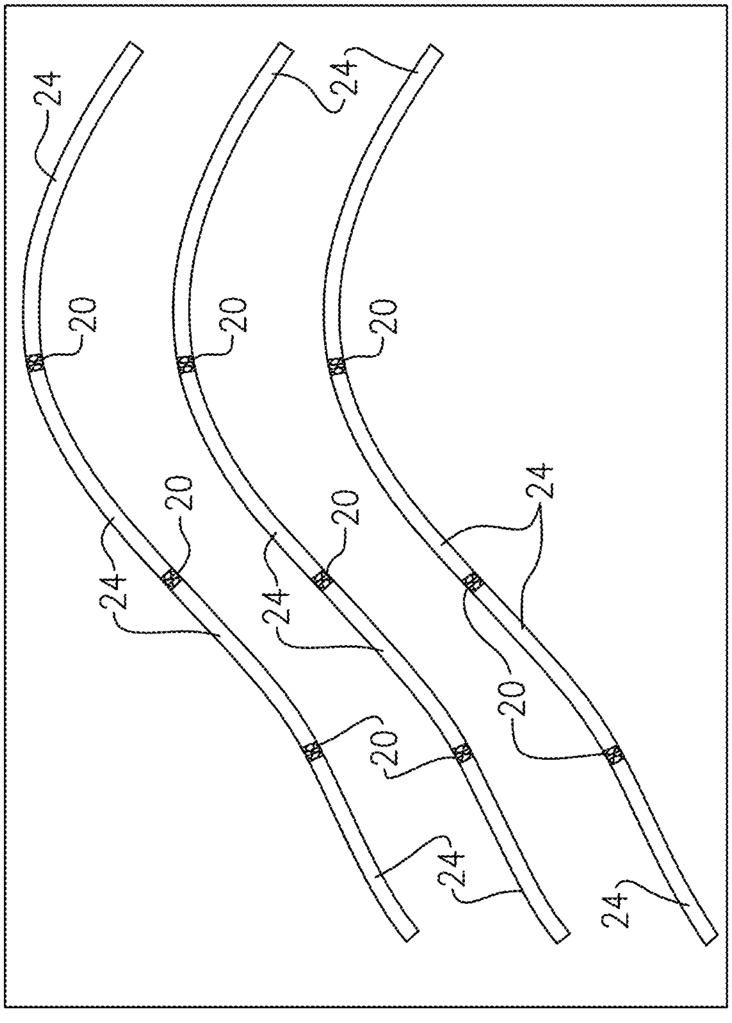
FIG. 4 is a top view of a plurality of light pipes that are connected to each other via the collimator lens.

In some implementations, the plurality of light pipes 24 comprise light pipes that are connected to each other in series as shown in FIG. 4. In this configuration, each set of opposing ends of adjacent light pipes 24 are separated from each other by a gap 26 that receives one collimator 20 as shown in FIG. 6.

In this example, there are three chains of light pipes 24 with each chain including three collimators 20. As such there are a total of nine LED collimators 20 and associated light pipes 24 that are used for the stop lamps 16. This set of nine LED collimators 20 is able to meet stop lamp photometric requirements; however, the illumination area requirements are not sufficiently met. The use of the pillow lens 22 on the top surface of the collimators 20 in combination with the angled surfaces 38, 40 allow the collimators 20 to spread collimated light through the light pipes 24 to meet stop lamp illumination area requirements.

In one example, the area requirement comprises at least 50 $cm^2$. However, it should be understood that the assembly can be tailored to meet other illumination area requirements as needed.

Figure 8:
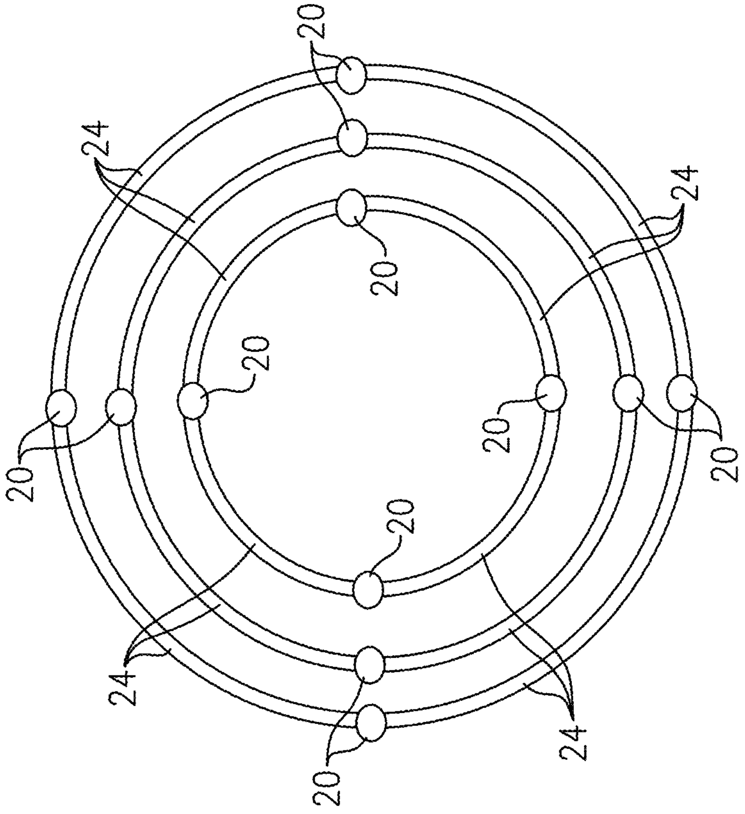
FIG. 8 is another example of a collimator lens and light pipe arrangement.

FIG. 8 shows another example of an assembly of collimators 20. In this example, the ends of the chains of light pipes 24 are connected to each other to form a circular pattern. The three chains may be configured to have different diameters to form a nested configuration.

In other examples, the chains can be configured in many different styling options as needed to meet design and aesthetic requirements.

Figure 10:
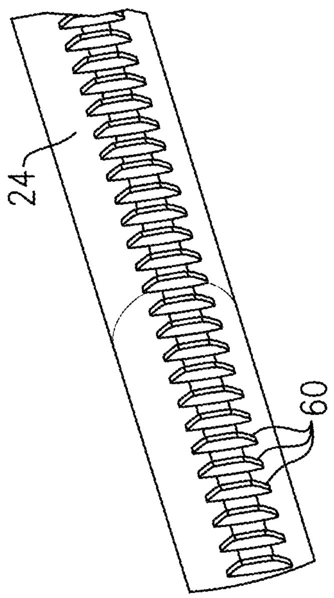
FIG. 10 is a perspective view showing prisms inside of a light pipe.

In some implementations, a plurality of prisms 60 may be located inside of the light pipes 24 as shown in FIG. 10. This allows light to be extracted along the light pipe 24 to generate a homogeneous illuminated appearance.

In some implementations, a method includes the steps of: positioning a collimator in a gap between two opposing ends of adjacent light pipes; positioning a light source at one end of the collimator; covering an opposite end of the collimator with a pillow lens; directing a first portion of light through the pillow lens; and directing a second portion of light exiting the pillow lens into the adjacent light pipes via angled surfaces extending way from the pillow lens.

The subject disclosure provides for several advantages for a unique stop lamp optical design with an optimized collimator. The disclosed assembly utilizes a high collection efficient LED collimator to collect light from one or more LEDs, and a pillow lens that is built on at least part of a top surface of the LED collimator. This configuration is used to meet stop lamp photometric requirements. Additionally, a 45 degree (+/−5 degrees) surface is also built on the remaining portion of the top surface of LED collimator, and is used to bend collimated light from the LED collimator to an approximately 45 degree angle and direct this bent light into a light pipe. As such, no light is wasted without being collected. In some implementations, the light pipe can be diffused material or a prismed light pipe to provide a homogeneous appearance. When the light pipe is illuminated, by adding light from the pillow lens on the LED collimator, the assembly meets stop lamp illumination surface area requirements of at least 50 $cm^2$.

The subject disclosure also provides for a highly efficient optical design that can be changed to many different shapes, sizes, and/or different combinations/stylings by using the assembly of the LED collimator, light pipes/prismed light pipes, and one or more angled surfaces.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An assembly, comprising:
- a collimator having one end associated with a light source;
- a pillow lens associated with the collimator;
- at least one surface that is non-coplanar with the pillow lens;
- at least one light pipe, wherein a first portion of light is directed through the pillow lens and a second portion of light exits the pillow lens and is directed by the at least one surface into the at least one light pipe; and
- wherein the at least one light pipe comprises a curved outer surface.

2. The assembly of claim 1, wherein the collimator comprises a conical body portion having a first outer peripheral dimension extending about a center axis at one end and a second outer peripheral dimension extending about the center axis at an opposite end that is greater than the first outer peripheral dimension, and wherein the conical body portion has an outer peripheral surface that continuously increases in taper from the one end to the opposite end.

3. The assembly of claim 2, wherein the light source is centered on the center axis at the one end.

4. The assembly of claim 2, wherein the at least one surface extends at an oblique angle relative to the center axis.

5. The assembly of claim 4, wherein the at least one surface comprises at least a first angled surface and a second angled surface, wherein each of the first angled surface and the second angled surface extend at an oblique angle relative to the center axis.

6. The assembly of claim 5, wherein the first angled surface faces the second angled surface.

7. The assembly of claim 5, wherein the first angled surface covers a first side portion of the pillow lens and the second angled surface covers a second side portion of the pillow lens leaving a center portion of the pillow lens uncovered.

8. The assembly of claim 7, wherein the at least one light pipe comprises at least a first light pipe and a second light pipe, and wherein the first angled surface extends from a first edge at the pillow lens outwardly away from the pillow lens to a second edge that is associated with the first light pipe, and wherein the second angled surface extends from a first edge at the pillow lens outwardly away from the pillow lens to a second edge that is associated with the second light pipe.

9. The assembly of claim 5, wherein the oblique angle comprises approximately a 45 degree angle or greater.

10. The assembly of claim 1, wherein the light source comprises a LED that is associated with a stop lamp or tail lamp.

11. The assembly of claim 1, including a plurality of prisms inside of the at least one light pipe.

12. An assembly comprising:

a plurality of light pipes including at least a first light pipe and a second light pipe;

a collimator positioned within a gap between opposing ends of the first light pipe and the second light pipe;

a light source positioned at one end of the collimator;

a pillow lens covering an opposite end of the collimator;

a first surface that is non-coplanar with the pillow lens and extends toward the first light pipe;

a second surface that is non-coplanar with the pillow lens and extends toward the second light pipe, wherein a first portion of light is directed through the pillow lens and a second portion of light exits the pillow lens and is directed by the first surface into the first light pipe and by the second surface into the second light pipe; and wherein the first light pipe and the second light pipe each have a curved outer surface.

13. The assembly of claim 12, wherein the plurality of light pipes comprise a plurality of additional light pipes that are connected to the first light pipe and the second light pipe in series, and wherein each set of opposing ends of adjacent light pipes are separated from each other by a gap that receives one collimator.

14. The assembly of claim 12, wherein the collimator comprises a conical body portion having a first outer peripheral dimension extending about a center axis at one end and a second outer peripheral dimension extending about the center axis at an opposite end that is greater than the first outer peripheral dimension, and wherein the conical body portion has an outer peripheral surface that continuously increases in taper from the one end to the opposite end.

15. The assembly of claim 14, wherein the light source is centered on the center axis at the one end.

16. The assembly of claim 15, wherein each of the first surface and the second surface extend at an oblique angle relative to the center axis.

17. The assembly of claim 16, wherein the first surface covers a first side portion of the pillow lens and the second surface covers a second side portion of the pillow lens leaving a center portion of the pillow lens uncovered.

18. The assembly of claim 17, wherein at least some of the first portion of light exits the pillow lens via the center portion in a direction that extends along the center axis, and wherein the second portion of light is directed into the first light pipe and the second light pipe to extend along paths that are generally perpendicular to the center axis.

19. The assembly of claim 12, including a plurality of prisms inside at least one of the first light pipe and the second light pipe.

20. A method comprising:

positioning a collimator in a gap between two opposing ends of adjacent light pipes each have a curved outer surface;

positioning a light source at one end of the collimator;

covering an opposite end of the collimator with a pillow lens;

directing a first portion of light through the pillow lens; and directing a second portion of light exiting the pillow lens into the adjacent light pipes via angled surfaces extending way from the pillow lens.

21. The method of claim 20, wherein each light pipe comprises a curved body extending along a length of the light pipe from a first end to a second end, and including guiding the second portion of light along a center axis of the light pipe from the first end to the second end.

22. The assembly of claim 12, wherein the first light pipe and the second light pipe each comprise a tubular body that extends along a length of the first light pipe and the second light pipe from a first end to a second end, and wherein the second portion of light is directed by the first surface and the second surface into the first end and is guided along the length to exit at the second end.

23. The assembly of claim 12, wherein the first surface extends from a first edge at the pillow lens outwardly away from the pillow lens to a distal second edge that is spaced from an outer peripheral surface of the first light pipe, and wherein the second surface extends from a first edge at the pillow lens outwardly away from the pillow lens to a distal second edge that is spaced from an outer peripheral surface of the second light pipe.

24. The assembly of claim 1, wherein the at least one light pipe comprises a tubular body that extends along a length of the at least one light pipe from a first end to a second end, and wherein the second portion of light is directed by the at least one surface into the first end and is guided along the length to exit at the second end.

25. The assembly of claim 1, wherein the at least one surface extends from a first edge at the pillow lens outwardly away from the pillow lens to a distal second edge that is spaced from an outer peripheral surface of the at least one light pipe.

* * * * *